United States Patent [19]

Schempp

[11] Patent Number: 5,134,680

[45] Date of Patent: Jul. 28, 1992

[54] SOLID STATE IMAGING APPARATUS WITH FIBER OPTIC BUNDLE

[75] Inventor: William V. Schempp, Tuscon, Ariz.

[73] Assignee: Photometrics, Ltd., Tucson, Ariz.

[21] Appl. No.: 698,454

[22] Filed: May 10, 1991

[51] Int. Cl.$^5$ .............................................. G02B 6/04
[52] U.S. Cl. .................................. 385/116; 250/208.1
[58] Field of Search ..................... 250/208.1, 227.2; 357/24 LR, 30 H, 30 M; 350/96.15, 96.24, 96.25, 96.27; 385/115, 116, 120, 121, 147

[56] References Cited

U.S. PATENT DOCUMENTS

| | | | |
|---|---|---|---|
| 3,211,912 | 10/1965 | Schwarz | 250/203 R |
| 3,757,127 | 9/1973 | Dhaka | 357/30 M |
| 4,707,600 | 11/1987 | Nakao et al. | 250/208.1 |
| 4,763,010 | 8/1988 | Fukaya et al. | 357/30 H |
| 4,767,192 | 8/1988 | Chang et al. | 357/30 H |

Primary Examiner—John D. Lee
Assistant Examiner—John Ngo
Attorney, Agent, or Firm—Herbert M. Shapiro

[57] ABSTRACT

A CCD imaging device employing a light-gathering, fiber optic bundle is made to exhibit improved spatial and contrast resolution by shaping the face of the smaller of the two faces of the fiber optic bundle to match the curvature found to be present in commercially available CCD's of a size necessary to achieve the resolution required for radiographic imaging.

8 Claims, 2 Drawing Sheets

SOLID STATE IMAGING APPARATUS WITH FIBER OPTIC BUNDLE

FIELD OF THE INVENTION

This invention relates to imaging devices primarily for radiology purposes and more particularly to such devices which employ solid state, light responsive sensors such as charge-coupled devices (CCD's).

BACKGROUND OF THE INVENTION

Solid state cameras for laboratory use and article inspection are commercially available. CCD's are common in such cameras. CCD cameras also are used for x-ray imaging when the x-ray image is arranged to impinge a phosphor screen. The phosphor screen responds to the impinging image to produce a corresponding light image which can be captured by film or by a digitizing device such as a CCD.

Co-pending application Ser. No. 633212 filed Dec. 21, 1990 still pending assigned to the assignee of the present application describes one such system. The system, in one embodiment, employs a fiber optic bundle which has a relatively large first face and a relatively small second face. The first face is optically coupled to the phosphor screen and the second face is optically coupled to a CCD chip. Resolution requirements for radiology usage are such that fairly large CCD devices are necessary. Such devices are available at sizes of one centimeter (cm) square or two centimeters square, or larger, nothing being available commercially between one and two cms square. The two centimeter chips include 1024×1024 picture elements (pixels) and provide the requisite resolution.

When such large CCD chips are used with fiber optic bundles, some pixels may displace from the fiber bundle surface, resulting in a relatively lower spatial and contrast resolution than expected from the system. Further damage to the CCD may result if the fiber surface directly contacts the CCD surface. Particularly since the medical profession cannot tolerate imprecision in x-ray imaging, such a problem had to be resolved.

BRIEF DESCRIPTION OF AN ILLUSTRATIVE EMBODIMENT OF THE INVENTION

The invention is based on the realization that the relatively large CCD chip necessary for achieving the desired resolution is characterized by a slight radius of curvature of about 4.7 to 6.1 meters. That slight curvature has been found to be the culprit causing not only the lower spatial and contrast resolution, but the damage as well.

In accordance with the principles of this invention, the exact curvature of the CCD chip is determined and the relatively small area face of the fiber optic bundle is formed with a matching curvature. Such a match can be achieved well within a few microns, a dimension relatively small in comparison to the diameter of an optical fiber or CCD pixel. The fiber optic bundle is positioned with respect to the CCD chip in a precision jig which maintains the positions of the components during an epoxy step which fixes the components to one another. Spatial and contrast resolution was found to improve substantially and damage was virtually eliminated by the resulting elimination of the non-uniform gap between the components.

DETAILED DESCRIPTION OF AN ILLUSTRATIVE EMBODIMENT OF THE INVENTION

Figure 1:
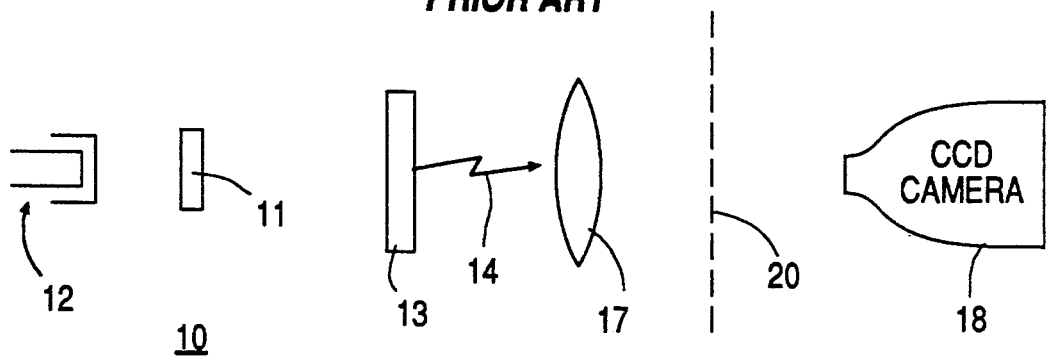
FIG. 1 shows a block diagram of a prior art imaging system.

FIG. 1 shows a schematic block diagram of a prior art imaging system 10 using a charge-coupled device (CCD) camera. The system is operative to expose an object 11 to high energy radiation such as from an x-ray source 12. The system includes a screen 13 such as a phosphor screen, responsive to the impinging x-ray pattern to form a visible light image 14. The visible light image is focused by lens 17 on to a CCD digitizer in camera 18. The exposure of the CCD digitizer is controlled by a shutter 20 in conventional fashion.

Figure 2:
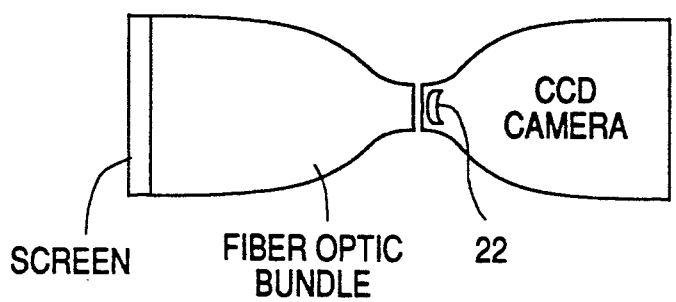
FIG. 2 shows a schematic diagram of a prior art optical subsystem employing a fiber optic bundle for use in the system of FIG. 1.

The CCD digitizer 22 is positioned at the head of camera 18 as indicated in FIG. 2. In one implementation of the system of FIG. 1, a fiber optic bundle is used to connect the screen to the CCD digitizer. Because the screen is significantly larger (7×7 inches) than the digitizer (2×2 cms) the exit face of the fiber optic bundle is relatively smaller than the entrance face. But the CCD digitizer (chip) is still quite large and has been found to have a non-planar geometry which causes the problems noted above.

Figure 3:
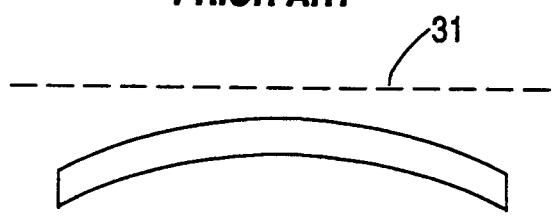
FIG. 3 shows an enlarged side-view of the exit face of the fiber optic bundle of FIG. 2 and the corresponding face of a CCD chip in the camera of FIG. 1.

FIG. 3 shows a side view of a typical large CCD chip 30 having a bow geometry with a radius of curvature between about 4.7 and 6.1 meters. The positioning of a planar exit face 31 of a fiber optic bundle against such a curved CCD chip also is illustrated in FIG. 3. It is clear that the space between the fiber bundle exit face and the CCD is non-uniform. A typical fiber optic bundle for such imaging applications includes in excess of one million fibers on 2 to 3 micron centers. A gap non-uniformity of eight microns or more results in loss of resolution at the CCD. A typical bow to a CCD chip of a size useful in imaging applications of the type contemplated is in excess of 50 microns. Thus, fibers can be displaced as much as one or two pixels causing loss of spatial and contrast resolution. Further, epoxy cement for attaching the exit face of the fiber optic bundle to a curved CCD chip loses strength because of the greater distance around the periphery of the seal. Thus, breakage occurs.

Figure 4:
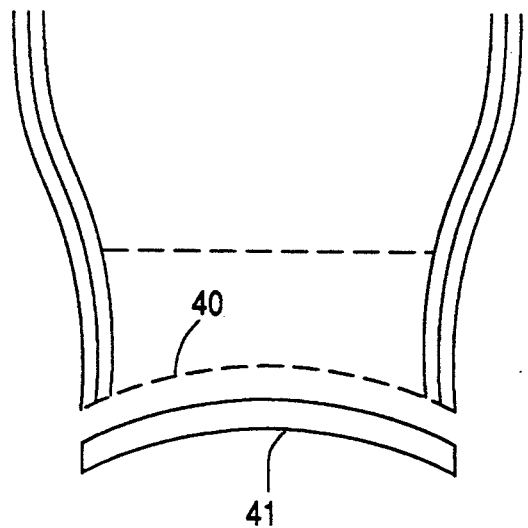
FIG. 4 shows an enlarged side view of the exit face of a fiber optic bundle and juxtaposed CCD chip in accordance with the principles of this invention.

FIG. 4 shows the exit face 40 of a fiber optic bundle which is polished into a curve which matches that of the CCD chip 41. It is clear that the gap between 40 and 41 is uniform, thus avoiding loss of spatial and contrast resolution as well as avoiding imperfect epoxy bonds.

Figure 5:
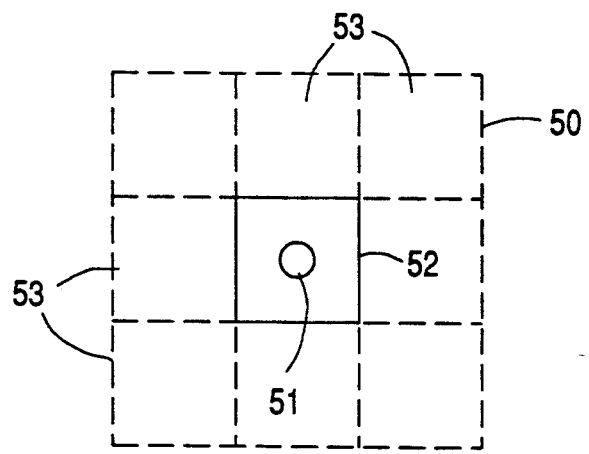
FIGS. 5 and 6 are a top views of a CCD chip segment showing pixel areas on the chip with superimposed circles representing the image from a fiber end in a corresponding segment of an exit face of an abutting fiber optic bundle.

FIG. 5 shows a top view of a CCD chip segment 50 with the light 51 from a fiber end in an abutted segment of an exit face of a fiber optic bundle superimposed on it. The CCD chip has an illustrative pixel area 52 with surrounding pixel areas 53. The light can be seen to be well defined to image the fiber end and being aligned with the center of the illustrative pixel area 52.

Figure 6:
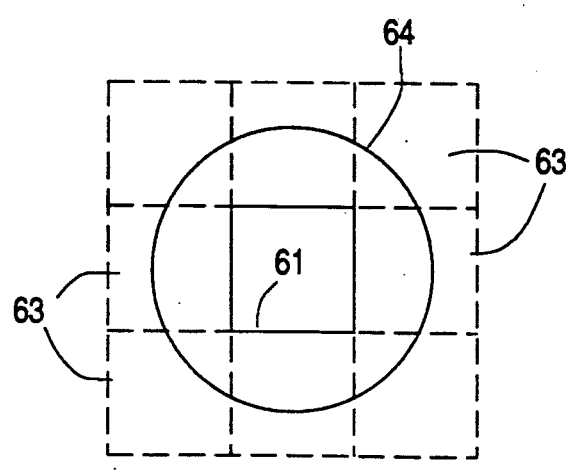

When the exit face of the fiber optic bundle and the CCD chip are not uniformly spaced apart from one another, the light from a representative fiber end in the exit face impinges on an area greater than the intended associated pixel of the CCD. The situation is represented in FIG. 6. In FIG. 6, the representative pixel area is designated 61 with the surrounding pixel areas being designated 63. The light from a fiber end which is spaced apart relatively more distant, than was the case in connection with FIG. 5, fans out as represented by circle 64 in FIG. 6 to impinge on pixel areas 63 as well as the representative pixel area. A curvature of the exit face of the fiber optic bundle to match the CCD chip curvature avoids the situation depicted in FIG. 6.

The curvature of each CCD wafer is measured with an interferometer. The wafer is centered on the optical axis of the interferometer and aligned perpendicular to it. This operation is accomplished by finding and centering the interference fringes on the image of the CCD wafer. The interference fringes are photographed and the fringes are counted to determine the radius of curvature.

The measurement of the fringes is carried out using an Olympus microscope and a 5× objective for facilitating the counting of the fringes. The fringes are counted from the center of the pattern to the four sides and the four corners of the CCD. The radius of curvature is then given by:

$$R^2 = \frac{\rho^2 + h^2}{2h}$$

where $\rho$ is the distance from the center of the CCD to the measured point and h is the height of the point as determined from the fringe count. The value of $\rho$ is typically about one centimeter, the value of h being typically near 20 microns.

The fiber optic bundle is then ground and polished to shape the exit face to match the CCD curvature so obtained. The exit face is polished to an optical finish, typically 40/20 scratch and dig, and the bundle then is cut to match the dimensions of the CCD wafer. A small groove is cut around the bundle, with a 400 grit grinding wheel, to serve as a physical stop for the fiber and as a vacuum seal in the camera. The groove is polished to a 16 microinch finish.

The exit face of the fiber optic bundle is inserted into a ceramic guide piece preparatory to attaching the exit face to the CCD wafer. The exit face and the ceramic guide piece are cleaned in a water solution in an ultrasonic cleaner; the ceramic for four minutes, the fibers for thirty seconds. The ceramic guide and fibers are rinsed in deionized water, methanol and acetone and blown dry. The CCD wafer is also thoroughly cleaned in conventional fashion.

The ceramic guide is glued to the CCD package with epoxy cement (i.e., EPO-TEK 730). The ceramic is aligned with the CCD using the Olympus microscope mentioned above and a crossed reticule. The procedure is to align the sides of the ceramic with the reticule and to focus the microscope onto the CCD surface. The position of the reticule represents the relative positions of the ceramic and the CCD. The ceramic is then moved to the correct position. The ceramic and CCD package are then epoxied and left to cure overnight at room temperature and, then, for two hours at 60° C.

The exit face of the fiber optic bundle is then bonded to the CCD surface. Typically, EPO-TEK 301-2 epoxy is used. The epoxy is mixed and degassed in a vacuum chamber for one hour.

The bundle is slid through the opening in the ceramic guide with a single drop of epoxy at the center of the exit face. The epoxy is cured for two days at room temperature followed by two hours at 60° C.

What is claimed is:

1. Apparatus including a semiconductor wafer having a first curvature and an array of m light sensing areas defined on it, said apparatus also including a fiber optic bundle comprising a plurality of n>>m optical fibers and having an entrance and an exit face, said fibers being positioned on centers spaced apart distances X small compared to the spacing Y between said sensing areas, said first curvature being large compared to X, said exit face being formed to match said first curvature, said wafer and said exit face having a uniform gap therebetween.

2. Apparatus as set forth in claim 1 wherein said wafer comprises a charge-coupled device.

3. Apparatus as set forth in claim 2 wherein said wafer is at least two centimeters on a side.

4. Apparatus as set forth in claim 3 wherein said wafer includes $10^6$ sensing areas spaced apart 20 μm and said fiber optic bundle includes in excess of ten million fibers spaced on 3–8 μm centers.

5. Apparatus as set forth in claim 4 wherein said curvature of said wafer and said exit face is less than 4 meters.

6. Imaging apparatus as set forth in claim 2 also including a fiber optic bundle having in excess of about one million optical fibers, the fiber ends in said first face being positioned on between 3 to 8 microns.

7. Imaging apparatus including a solid state imaging device having a plurality of pixel-defining, light-responsive areas defined thereon, said areas being spaced apart a distance n, said imaging device having a curvature of m≧2n, said apparatus also including a fiber optic bundle having a relatively small first face and a relatively large second face, said first face also having a curvature of m, said first face and said imaging device being in a fixed position with respect to one another such that the gap therebetween is uniform.

8. Imaging apparatus as set forth in claim 7 wherein said solid state device is a charge-coupled device having a surface area of about one centimeter square and including about 64,000 pixels arranged in rows and columns.

* * * * *